May 23, 1933.  W. SZYMINSKI  1,910,864
BRACKET FOR MIRRORS AND THE LIKE
Filed Nov. 21, 1931  4 Sheets-Sheet 1
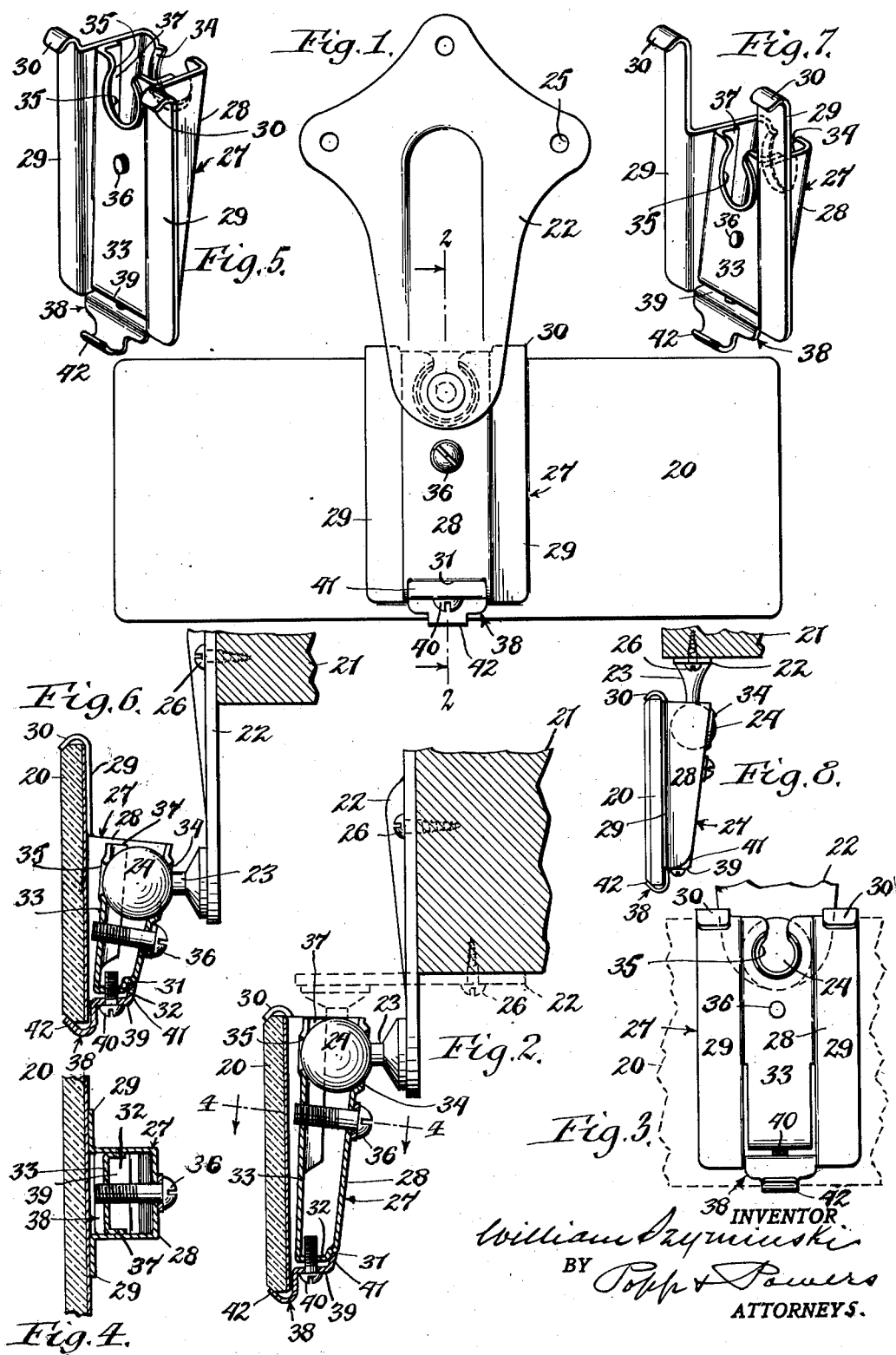

May 23, 1933. W. SZYMINSKI 1,910,864
BRACKET FOR MIRRORS AND THE LIKE
Filed Nov. 21, 1931   4 Sheets-Sheet 2
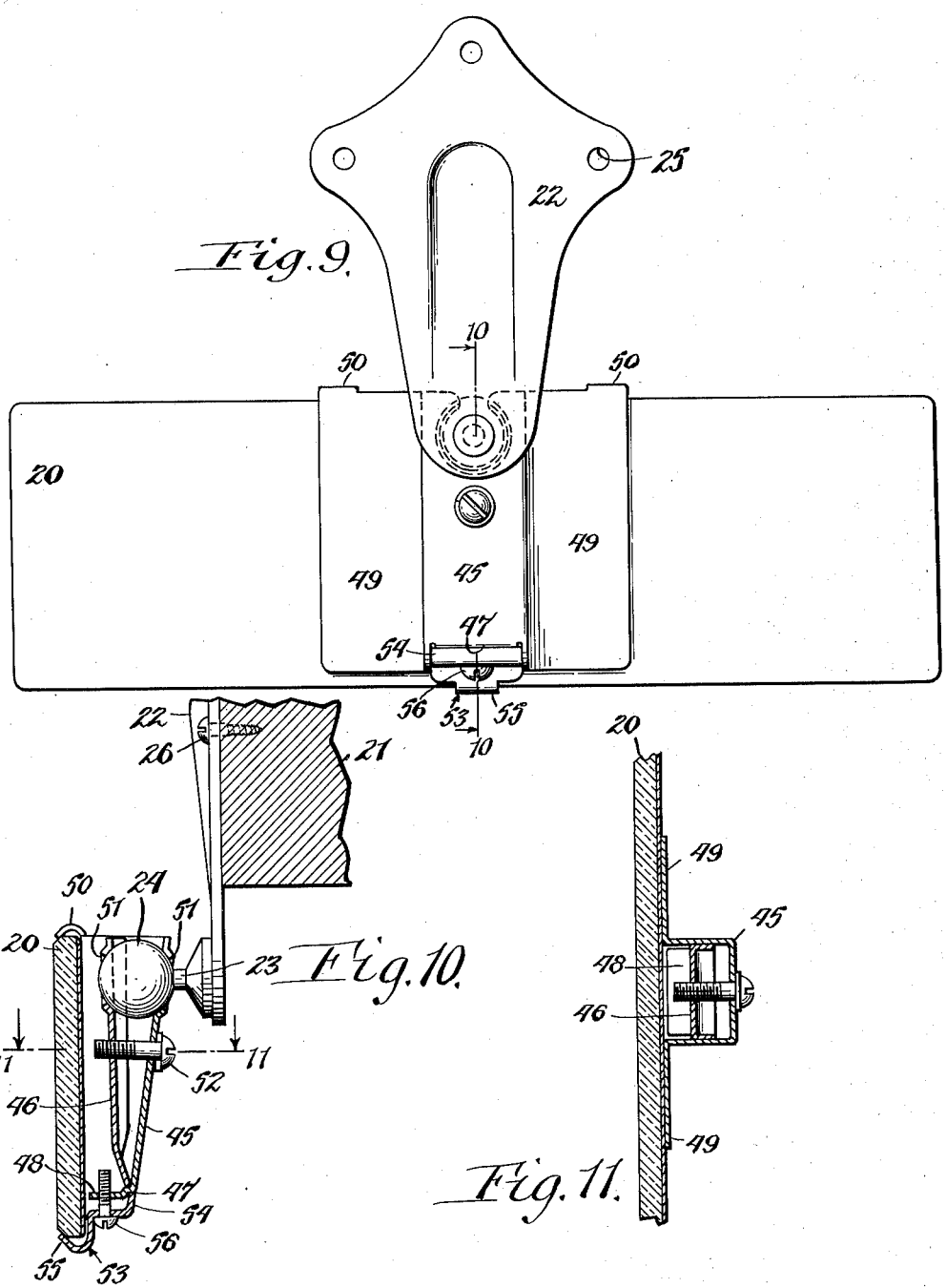
INVENTOR
William Szyminski
BY Popp & Powers
ATTORNEYS May 23, 1933.　　　W. SZYMINSKI　　　1,910,864
BRACKET FOR MIRRORS AND THE LIKE
Filed Nov. 21, 1931　　　4 Sheets-Sheet 3

INVENTOR
William Szyminski
BY Popp & Powers
ATTORNEYS

May 23, 1933. W. SZYMINSKI 1,910,864
BRACKET FOR MIRRORS AND THE LIKE
Filed Nov. 21, 1931 4 Sheets-Sheet 4
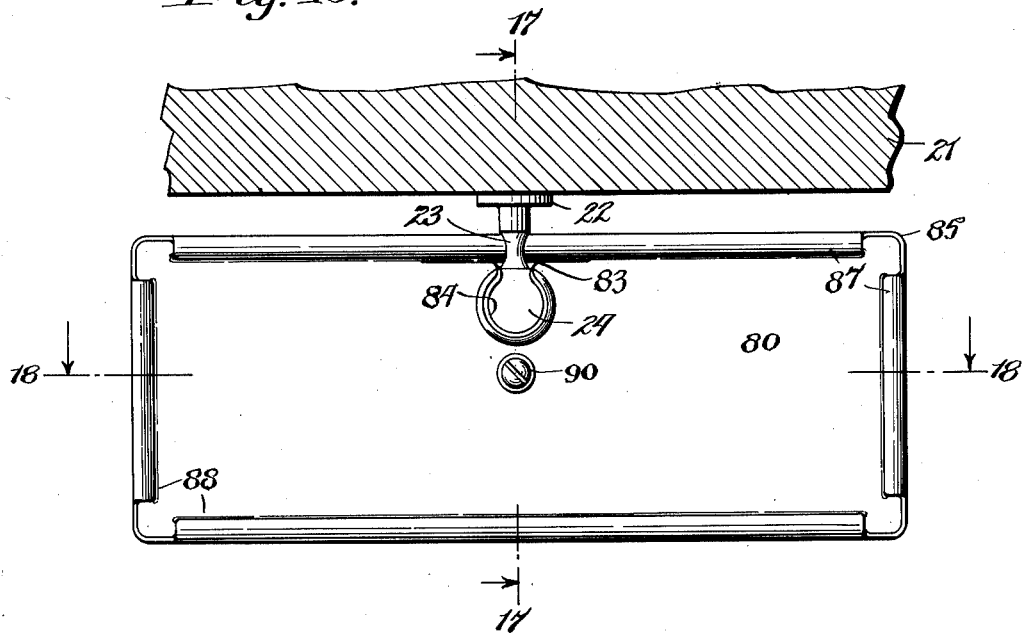
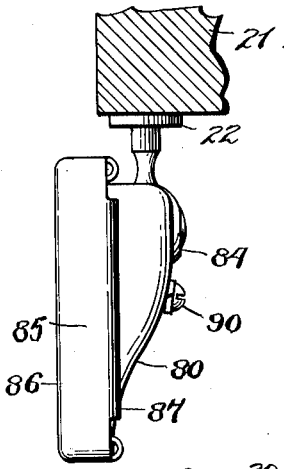
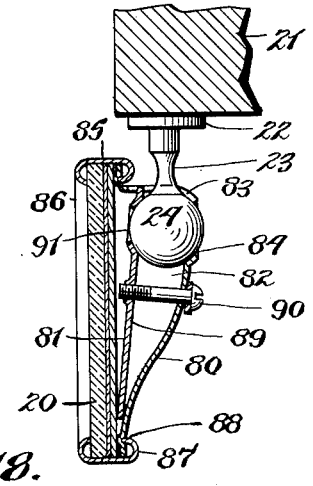
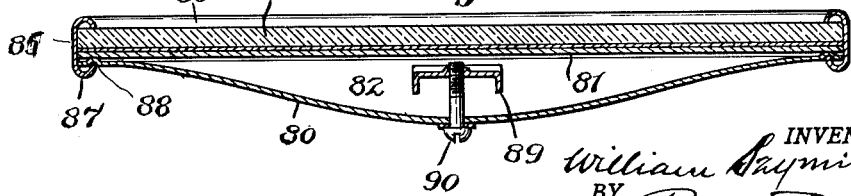
INVENTOR
William Szyminski
BY Popp & Powers
ATTORNEYS Patented May 23, 1933

1,910,864

UNITED STATES PATENT OFFICE

WILLIAM SZYMINSKI, OF LAKE VIEW, NEW YORK, ASSIGNOR TO STANDARD MIRROR COMPANY INC., OF BUFFALO, NEW YORK, A CORPORATION OF NEW YORK

BRACKET FOR MIRRORS AND THE LIKE

Application filed November 21, 1931. Serial No. 576,530.

This invention relates to a rear vision mirror mounting and more particularly to a universal mounting for supporting a rear vision mirror from the head bar of an automobile windshield so that the driver can adjust the mirror to obtain a view of the road in rear of his automobile through the rear window of the car.

One of the principal objects of this invention is to provide such a mounting which avoids displaying of the unsightly flanges, screws and other mechanical parts which are a necessary part of such a mounting and instead houses all of these parts in such manner that the only parts which are visible through the windshield of an automobile are the essential adjustments.

Another object of the present invention is to provide an extremely low cost universal mounting for a rear vision mirror which is composed of but few inexpensive parts and is at the same time rugged and durable in construction and easily moved to any desired position on its universal joint.

Another aim is to provide such a construction which can be so designed that the universal joint is arranged at the center of the mirror or adjacent the margin thereof thereby permitting the invention to be employed under the different conditions imposed by the designer of the automobile body.

A further purpose is to provide such a mounting which permits the rear vision mirror to be arranged directly under the head bar of the automobile or to be arranged in rear of this head bar either through a bracket secured to the rear side of the head bar or to the under side thereof.

In the accompanying drawings:

Figure 1 is an elevation of one form of rear vision mirror embodying my invention viewed from the rear or non-reflecting side thereof.

Figure 2 is a vertical, longitudinal section taken on line 2—2 of Fig. 1.

Figure 3 is a front elevation of the form of mounting shown in Figs. 1 and 2 and showing the mirror in dotted lines.

Figure 4 is a section taken on line 4—4, Fig. 2.

Figure 5 is a perspective view of one part of the universal mounting shown in Figs. 1—4.

Figure 6 is a view similar to Fig. 2 showing the ball about which the rear vision mirror swings arranged centrally of the mirror instead of near the top thereof as shown in Figs. 1—5.

Figure 7 is a perspective view similar to Fig. 5 and showing the modified form of the invention illustrated in Fig. 6.

Figure 8 is an end elevation of the form of the invention shown in Figs. 1—5 but showing the attaching bracket secured to the under side of the head bar of the wind shield and depending therefrom.

Figure 9 is a view similar to Fig. 1 and showing a further modified form of the invention.

Figure 10 is a section taken on line 10—10, Fig. 9.

Figure 11 is a horizontal section taken on line 11—11, Fig. 10.

Figure 15 is a view similar to Figs. 1, 9 and 12 and showing a further modified form of the invention.

Figure 16 is an end view of the form of the invention shown in Fig. 15.

Figure 17 is a section taken on line 17—17, Fig. 15.

Figure 18 is a horizontal section taken on line 18—18, Fig. 15.

Figure 12:
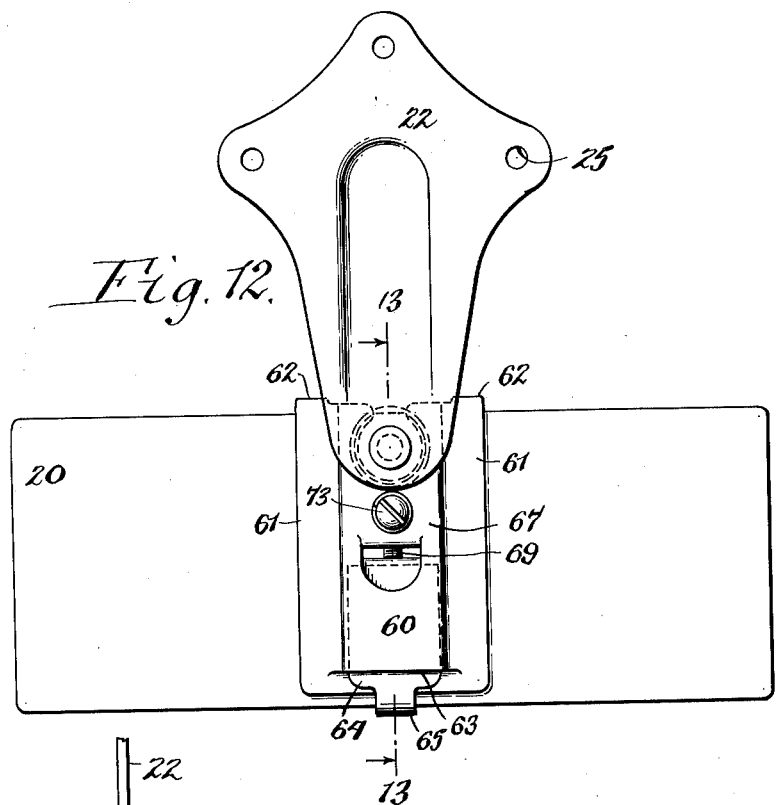
Figure 12 is a view similar to Figs. 1 and 9 and showing a still further modification of the invention.

In all of the forms of the invention shown, the rear vision mirror 20 is shown as being rectangular in form and supported from the head bar 21 of the wind shield of an automobile.

It will, however, be apparent that the mounting can be employed with mirrors of any shape and that it can also be used to support a mirror clock combination or other devices of like nature. To the head bar 21 of the automobile windshield is secured a suitable bracket 22 which can be of any suitable form to match the other hardware of the car and carries a stem 23 the outer end of which is formed to provide a ball 24 which forms the ball of the ball and socket universal joint which carries the mirror 20. This bracket 22 can be of any suitable form and as shown in Fig. 1 preferably consists of a vertical plate having holes 25 which receive screws 26 which secure the bracket against the rear face of the head bar 21. If desired, however, the bracket 22 can be secured to the under side of the head bar 21 of the automobile wind shield as indicated by dotted lines in Fig. 2 and the bracket and ball can also be so formed that the bracket is secured directly to the under side of the wind shield head bar and the ball 24 depends directly therefrom, as indicated in Figs. 8 and 15–17.

In the form of the invention shown in Figs. 1–5 the socket member 27 of the mounting consists of a single piece of sheet metal. The rear outer or housing part 28 of this piece of sheet metal is of U-shape form in horizontal section and extends substantially the height of the mirror 20 and the vertical channel within this U-shaped rear portion 28 is larger at the top than at the bottom, as indicated in Figs. 2 and 5. The outer or front edges of the legs of this U-shaped rear or housing portion 28 are bent to provide laterally extending flanges 29 which bear against the rear or coated side of the mirror 20 and the upper ends of each of these side flanges 29 are bent to provide lips or fingers 30 which extend over the upper margin of the mirror plate 20 and firmly hold the same, as will be more fully hereinafter described. The lower rear part of the outer or housing portion 28 is formed to provide a recess or notch 31 and below this notch or recess 31 the strip of metal is bent to provide a horizontal tongue 32 the front end of which is bent upwardly to provide an integral plate 33 which is disposed between the side walls of the outer housing portion 28 of this part. It is therefore apparent that the sheet metal part 27 of this support is U-shaped in vertical section. The upper end of the rear wall of the part 28 of the mounting is formed to provide a half socket 34 and the upper end of the tongue or inner plate 33 of this part is also formed to provide a half socket 35. In use the ball 24 is disposed between the half sockets 34 and 35 and is held in firm frictional engagement with these sockets by means of an adjusting screw 36 which extends through the rear wall of the outer or housing portion 28 of the sheet metal part 27 and has threaded engagement with the tongue or inner plate 33 thereof. It is apparent that upon tightening the screw 36 the inner tongue or plate 33 will be flexed rearwardly and its socket 35 drawn into firm engagement with the ball 24 so that the ball 24 is clamped between the sockets 34 and 35 with sufficient pressure to prevent the mirror from dropping and at the same time permit it to be manually adjusted into any desired position. The tongue or inner plate 33 of the sheet metal part 27 is preferably strengthened by the provision of side flanges 37 which extend rearwardly at opposite sides of this tongue.

In order to clamp the mirror plate 20 against the flanges 29 and under the fingers 30 a small clip 38 is employed. This clip consists of a horizontal part 39 through which a clamping screw 40 extends. This clamping screw 40 has threaded engagement with the lower horizontal part 32 of the sheet metal part 27 so that upon tightening the screw the clip is drawn upwardly. The rear end of the clip 38 is bent upwardly to provide a flange 41 which fits into the recess 31 and fulcrums or hinges therein. The front end of the clip 38 is bent to provide a lower finger or lip 42 which fits around the lower margin of the mirror plate 20. It is apparent that upon tightening the screw 40 the clip 38 will be drawn upwardly swinging about the connection between its flange 41 and the recess 31 and the lip or finger 42 will be drawn upwardly thereby clamping the rear plate between the fingers 30 and 42 and drawing the mirror plate into firm engagement with the flanges 29. It is apparent that instead of having the ball 24 arranged adjacent the top of the mirror, this ball can be arranged adjacent the center of the mirror by shortening the outer housing 28 and the inner tongue or plate 33. This form of construction is illustrated in Figs. 6 and 7.

Instead of the single piece construction of the sheet metal plate 27, this may be made into two pieces as illustrated in Figs. 9–11. In this form the two halves of the socket which grip the ball 24 are made in two pieces, a rear or housing plate 45 and an inner clamping plate 46 which is housed within the outer or housing plate 45. As in the preferred construction the outer plate 45 is U-shaped in horizontal section and tapers inwardly toward the bottom and is provided with a recess or groove 47 and an inwardly extending horizontal part 48 at its lower end. This outer housing is formed to provide wide laterally extending flanges 49 which are bent outwardly from the front ends of the legs of the U-shaped housing 45 and form a back for the mirror plate 20. At the upper end of each of these flanges 49, lips or fingers 50 are formed which extend over and embrace the upper margin of the mirror plate 20. The inner clamping plate 46 is disposed within the outer housing plate 45 and its lower end bears against the corner between the rear wall of the outer housing 45 and the horizontal bottom 48 thereof, as best shown in Fig. 10. The housing plates 45 and 46 are formed at their upper ends to provide half sockets 51 which clamp against opposite sides of the ball 24 and the inner plate 46 is drawn rearwardly by means of a screw 52 which extends through the rear wall of the housing plate 45 and has threaded engagement with the inner clamping plate 46. The mirror is clamped to the fingers 50 and the backing flanges 49 by means of a clip 53 which, as in the form of the invention shown in Figs. 1—8 is provided with an upwardly extending rear flange 54 which fits into and pivots in the recess 47. At its front end the clip 53 is formed to provide a finger 55 which embraces the lower margin of the mirror and a screw 56 draws the finger 55 into firm engagement with the lower margin of the mirror plate so as to clamp the mirror plate in position.

Figure 13:
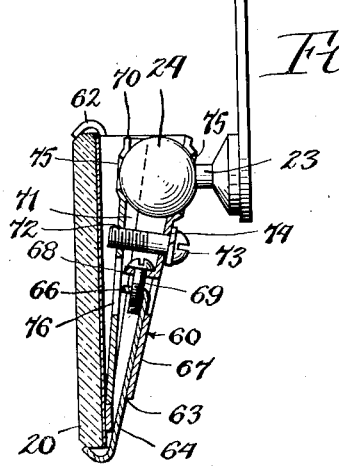
Figure 13 is a vertical section taken on line 13—13, Fig. 12.
Figure 14:
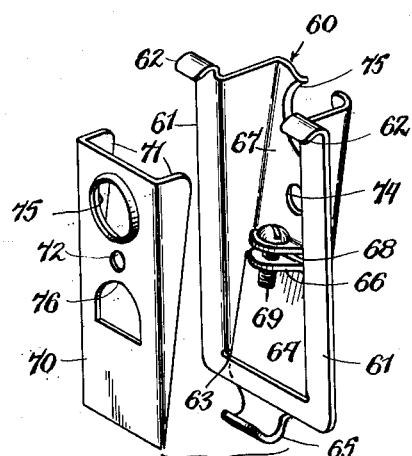
Figure 14 is an exploded perspective view of some of the parts of the form of the invention illustrated in Figs. 12 and 13.

In the form of the invention shown in Figs. 12—14 the outer housing plate 60 is of U form in cross section and is of tapering form as in the other forms of the invention. This outer housing plate is formed to provide lateral flanges 61 which form a backing for the mirror plate 20 and these flanges 61 are formed at their upper ends to provide fingers 62 which fit over the upper margin of the mirror. At its lower end the outer housing plate 60 is provided with a slot 63 which receives a slide 64. The lower end of this slide 64 is formed to provide a lip or finger 65 which embraces the lower margin of the mirror plate 20 and the upper end of this slide 64 is formed to provide a flange 66 which has a threaded hole. Adjacent the upper end of the slide 64 the rear wall 67 of the housing plate 60 is struck inwardly to provide an ear 68 which carries a screw 69, this screw screwing into the threaded opening in the ear 66 of the slide 64. It is apparent that upon placing the mirror plate 20 between the fingers 62 and 65, the screw 69 can be tightened and the slide 64 drawn up so as to clamp the mirror plate between these fingers 62 and 65 and in firm engagement with the backing flanges 61. The inner clamping plate consists of a sheet metal plate 70 which is reinforced at its edges by strengthening flanges 71 and is provided with a threaded hole 72, this hole receiving a screw 73 which extends through a hole 74 in the rear wall 67 of the housing plate 60. As in the other forms of the invention, the upper ends of both the rear wall 67 of the housing plate 60 and the inner plate 70 are formed to provide half sockets 75 which embrace opposite sides of the ball 24. When the screw 73 is tightened these half sockets 75 are drawn into firm frictional contact with the ball 24 so as to hold the mirror in any position to which it may be manually adjusted. The front plate 70 is also preferably provided with an opening 76 which provides clearance and insures that the clamping plate 70 is not interfered in its movement by the ears 68 and 66 of the housing plate 60 and slide 64 respectively.

In the form of the invention shown in Figs. 15—18 the mirror plate 20 is backed by a sheet metal plate 80 which engages a cardboard backing 81 at its margin and bulges rearwardly so that at its upper center a space 82 is provided which is sufficiently large to receive the ball 24. This backing plate 80 forms the housing plate of the invention and is formed to provide an opening 83 through which the ball 24 is inserted and also a jaw 84 which is adapted to engage one side of the ball 24. The margins of the mirror 20 and the backing or housing plate 81 are held together by a ring or rim 85, the front edge of which is turned over or reversely formed to provide a bead 86 which engages the front face of the mirror 20 and extends completely around the mirror. The rear edge of this rim 85 is formed to provide four flanges 87 which, after the mirror plate 20, cardboard backing 81, backing plate 80 and rim 85 are assembled, are turned over so that their edges engage grooves or recesses 88 provided in the rear face of the backing plate 80. In the space 82 within the backing or housing plate 80 is arranged a clamping plate 89 which is drawn rearwardly by a screw 90. The upper end of this clamping plate 89 is formed to provide a jaw or half socket 91 which bears against the opposite or front side of the ball 24. Upon tightening the clamping bolt 90, the half sockets 84 and 91 are drawn into firm engagement with the opposite sides of the ball 24 and hold the mirror plate 20 in any position to which it may be adjusted.

It is apparent that all of the forms of my invention provide a mounting for rear vision mirrors which is extremely neat and attractive in appearance when viewed through the windshield of an automobile, the more particularly in that the clamping elements and necessary flanges are practically entirely concealed within the housing plate so that the only parts which are visible are this housing plate and the necessary adjusting screws. It is also apparent that the invention is very simple and rugged in construction and will reliably hold the mirror in any position in which it may be adjusted and still permit of its manual adjustment to any desired position without requiring the manipulation of any adjusting screws or the like.

It is also apparent that mountings embodying the invention can be produced at extremely low cost thereby permitting the sale of such mountings at a low price.

I claim as my invention:

1. A bracket structure for mirrors and the like, comprising a support having a head, a housing plate enclosing and bearing against one side of said head, a clamping plate arranged in said housing plate and directly connected at one end only to said housing plate, said clamping plate bearing against the opposite side of said head, means for drawing said plates together to clamp the head therebetween and means for supporting the mirror from one of said plates.

2. A bracket structure for mirrors or the like, comprising a substantially spherical support, a housing plate receiving said support and having rear and side walls, socket means carried by said plate and adapted to bear against one side of said support, a clamping plate arranged in said housing and directly connected at one end only to said housing plate at a place remote from said socket means, socket means carried by said clamping plate and adapted to bear against the opposite side of said support, means for drawing said plates together and means for holding said mirror against the front edges of the side walls of said housing plate.

3. A bracket structure for mirrors or the like, comprising a substantially spherical support, a housing plate which is U-shape in cross section and open at one end, said housing plate being formed to provide a U-shaped opening at its open end, which opening forms a socket adapted to embrace and bear against one side of said support, a clamping plate arranged in said housing and supported at one end thereby, socket means carried by said clamping plate and adapted to bear against the opposite side of said support, means for drawing said plates together to clamp said support therebetween hand means for holding said mirror against the front edges of said housing plate.

4. A bracket structure for mirrors or the like, comprising a substantially spherical support, a housing plate having a rear wall and side walls extending forwardly from said rear wall, said side walls being deeper at one end than the other whereby said housing plate is tapering in form, a socket provided in said rear wall adjacent the larger end of said housing plate and adapted to bear against one side of said support when said support is arranged in said housing plate, a clamping plate arranged in said housing plate and supported at one end by said housing plate, socket means carried by said clamping plate and adapted to bear against the opposite side of said support, means for drawing said plates together to clamp said support therebetween and means for holding said mirror against the front edges of said housing plate.

5. A bracket structure for mirrors or the like, comprising a substantially spherical support, a housing plate receiving said support and having rear and side walls, a flange extending laterally from the forward edge of each of said side walls, socket means carried by said plate and adapted to bear against one side of said support, a clamping plate arranged in said housing and supported at one end only thereby, socket means carried by said clamping plate and adapted to bear against the opposite side of said support, means for drawing said plates together and means for holding said mirror against the front faces of the said flanges of said housing plate.

6. A bracket for mirrors or the like, comprising a substantially spherical support, a housing plate having a rear wall and side walls extending forwardly from said rear wall, said side walls being deeper at one end than the other whereby said housing plate is tapering in form, a flange extending laterally from the forward edge of each of said side walls, a socket provided in said rear wall adjacent the larger end of said housing plate and adapted to bear against one side of said support when said support is arranged in said housing plate, a clamping plate arranged in said housing plate and supported at one end by said housing plate, a socket carried by said clamping plate and adapted to bear against the opposite side of said support, means for drawing said plates together to clamp said support therebetween and means for holding said mirror against the front faces of said flanges.

7. A bracket structure for mirrors or the like, comprising a substantially spherical support, a housing plate receiving said support and being adapted to bear against one side of said support, a clamping plate housed within said housing plate and supported at one end thereby, said clamping plate bearing against the opposite side of said support, means for drawing said plates together and means connected to said housing plate for holding said mirror against one side of said housing plate comprising a finger provided at one side of said housing plate and engaging one margin of said mirror, a clip arranged at the opposite end of said housing plate and engaging the opposite margin of said mirror and means for drawing said clip into firm engagement with the mirror margin and the housing plate.

8. A bracket structure for mirrors or the like, comprising a substantially spherical support, a housing plate receiving said support and being adapted to bear against one side of said support, a clamping plate housed within said housing plate and supported at one end thereby, said clamping plate bearing against the opposite side of said support, means for drawing said plates together and means connected to said housing plate for holding said mirror against one side of said housing plate comprising a finger provided at one side of said housing plate and engaging one margin of said mirror, a clip arranged at the opposite end of said housing plate and engaging the opposite margin of said mirror and means for drawing said clip into firm engagement with the mirror margin and the housing plate, comprising a screw carried by said housing plate and adapted to draw said clip toward said housing plate.

9. A bracket structure for mirrors or the like, comprising a substantially spherical support, a housing plate receiving said support and being adapted to bear against one side of said support, a clamping plate housed within said housing plate and supported at one end thereby, said clamping plate bearing against the opposite side of said support, means for drawing said plates together and means connected to said housing plate for holding said mirror against one side of said housing plate, comprising a finger provided at one side of said housing plate and engaging one margin of said mirror, a clip arranged at the opposite end of said housing plate and bearing at one end against said housing plate and at its other end against the adjacent margin of the mirror, and a screw extending through said clip intermediate its ends and having threaded engagement with said housing plate.

10. A bracket structure for mirrors or the like, comprising a substantially spherical support, a housing plate receiving said support and being adapted to bear against one side of said support, a clamping plate housed within said housing plate and supported at one end thereby, said clamping plate bearing against the opposite side of said support, means for drawing said plates together and means connected to said housing plate for holding said mirror against one side of said housing plate, comprising a finger provided at one side of said housing plate and engaging one margin of said mirror, a clip arranged at the opposite end of said housing plate and having one end arranged in a recess provided in said housing plate and bearing at its other end against the adjacent margin of the mirror, and a screw extending through said clip intermediate its ends and having threaded engagement with said housing plate.

11. A bracket structure for mirrors or the like, comprising a substantially spherical support, a housing plate receiving said support, and being adapted to bear against one side of said support, a clamping plate housed within said housing plate and supported at one end thereby, said clamping plate bearing against the opposite side of said support, means for drawing said plates together and means connected to said housing plate for holding said mirror against one side of said housing plate, comprising a finger provided at one side of said housing plate and engaging one margin of said mirror, a clip having one part arranged in said housing plate and having another part extending outwardly therefrom and adapted to engage the opposite margin of the mirror and screw means housed in said housing plate and connecting said housing plate with that portion of the clip arranged in said housing plate whereby upon tightening said screw means said clip is drawn into tight engagement with the mirror.

12. A bracket structure for mirrors or the like, comprising a substantially spherical support, a housing plate receiving said support, and being adapted to bear against one side of said support, a clamping plate housed within said housing plate and supported at one end thereby, said clamping plate bearing against the opposite side of said support, means for drawing said plates together and means connected to said housing plate for holding said mirror against one side of said housing plate, comprising a finger provided at one side of said housing plate and engaging one margin of said mirror, a clip having a flange at one end and having that end arranged in said housing plate, the opposite end of said clip extending outwardly through an opening in said housing plate and being formed to engage the opposite margin of said mirror, a flange struck inwardly from said housing plate adjacent the flange on said clip and a screw connecting said flanges and adapted to draw said clip into tight engagement with the mirror.

13. A bracket for mirrors or the like, comprising a substantially spherical support, a housing plate having a rear wall, side walls extending forwardly from said rear wall and flanges extending laterally from the front edges of said side walls, said housing plate being adapted to receive and bear against one side of said support, a clamping plate arranged in said housing plate and supported at one end by said housing plate, said clamping plate being adapted to bear against the opposite side of said support, means for drawing said plates together and means for holding said mirror against the front faces of said flanges comprising a finger formed integrally at one end of each of said flanges and engaging the adjacent margin of the mirror and a third finger connected with said housing plate and adapted to be tightened into engagement with the margin of the mirror at a third place.

14. A bracket for mirrors or the like, comprising a substantially spherical support, a housing plate which is U-shaped in cross section, said housing plate having a tongue at one end which is bent back within the channel in said housing plate to form a clamping plate, means adjacent the outer end of said clamping plate for clamping opposite sides of said support between said clamping plate and housing plate, means for drawing said plates together and means for securing a mirror to the open side of said housing plate.

15. A bracket for mirrors or the like, comprising a substantially spherical support, a housing plate which is of U-shaped channel form, said housing plate having a tongue at one end which is bent back within the channel of the housing plate to form a clamping plate, means adjacent the free end of said clamping plate for clamping said support between said clamping and housing plates, a screw between said support and the place of juncture between said plates for drawing said plates together, strengthening flanges at opposite sides of said clamping plate and means for securing a mirror plate across the open longitudinal side of said housing plate.

16. A bracket for mirrors or the like, comprising a substantially spherical support, a housing plate which is of U-shaped channel form, a clamping plate arranged within the channel of said housing plate, one end of said clamping plate and the adjacent end of said housing plate being adapted to clamp said support between them and the opposite end of said clamping plate bearing against the inside of said housing plate, means between said support and the place of contact between said plates for drawing said plates together and means for securing a mirror plate across the open longitudinal side of said housing plate.

In testimony whereof I hereby affix my signature.

WILLIAM SZYMINSKI.